US006582632B1

(12) United States Patent
Urbanek

(10) Patent No.: US 6,582,632 B1
(45) Date of Patent: Jun. 24, 2003

(54) INJECTION MOLDING MACHINE

(75) Inventor: Otto Urbanek, Linz (AT)

(73) Assignee: Engel Maschinenbau Gesellschaft m.b.H., Schwertberg (AT)

( * ) Notice: Subject to any disclaimer, the term of this patent is extended or adjusted under 35 U.S.C. 154(b) by 342 days.

(21) Appl. No.: 09/644,129

(22) Filed: Aug. 23, 2000

(30) Foreign Application Priority Data

Aug. 25, 1999 (EP) .............................................. 99116685

(51) Int. Cl.⁷ ................................................ B29C 45/76
(52) U.S. Cl. ................... 264/40.1; 264/328.1; 425/136; 425/169; 73/767
(58) Field of Search ........................... 264/40.1, 328.1; 425/136, 169–172; 73/767; 700/79, 82, 200, 204

(56) References Cited

U.S. PATENT DOCUMENTS

| 3,851,157 A | * 11/1974 | Ellis ........................... 702/199 |
| 5,214,913 A | * 6/1993 | Tani et al. ............. 137/625.64 |
| 5,427,720 A | * 6/1995 | Kotzab .................. 264/328.16 |
| 5,566,092 A | * 10/1996 | Wang et al. ................. 700/159 |
| 5,757,641 A | 5/1998 | Minto |
| 5,954,089 A | * 9/1999 | Seymour ..................... 700/282 |

FOREIGN PATENT DOCUMENTS

| DE | 19709609 | 9/1998 |
| DE | 19730259 | 2/1999 |
| EP | 0524330 | 1/1993 |

OTHER PUBLICATIONS

Patent Abstracts of Japan, "Detection of Abnormality of Injection Stroke Sensor . . . ," Inventor: Katsumi, Y. App. No. 59015862, App. Date Jan. 31, 1984.

* cited by examiner

Primary Examiner—Jill L. Heitbrink
(74) Attorney, Agent, or Firm—Notaro & Michalos P.C.

(57) ABSTRACT

An injection molding machine for plastic materials, the operation of which is governed by continuous monitoring of at least one measurement parameter, wherein there is provided a control which outputs a signal upon failure of a sensor which detects the measurement parameter, wherein at least two sensors (3, 3') are associated with one and the same measurement parameters and the control records the failure of a sensor (3, 3') without causing stoppage of the machine.

5 Claims, 4 Drawing Sheets

INJECTION MOLDING MACHINE

DESCRIPTION

The invention relates to an injection molding machine for plastic materials, the operation of which is governed by continuous monitoring of at least one measurement parameter, wherein there is provided a control which outputs a signal upon failure of a sensor which detects the measurement parameter.

In order to guarantee safeguarding of the apparatus and a minimum product quality, some parameters have to be continuously monitored in operation of an injection molding machine. In the event of a breakdown of the monitoring apparatus it is therefore necessary for the machine to be immediately shut down. Typically the stroke of the movable mold mounting plate and that of the ejector on the closing side and the stroke of the injection unit as well as the stroke of the metering screw in the measurement cylinder on the injection side are monitored. Limit switches monitor the attainment of predetermined positions, for example the end position of a nut. Temperature sensors are associated with the measurement cylinder, the cooling fluid for mold cooling and the hydraulic fluid which may possibly be provided. In the case of hydraulically actuated machines at any event the pressure in the injection cylinder and the pressure in each single hydraulic pump as well as the pressure in the high-pressure closing cylinder (pressure higher than . . . ) are monitored.

In many cases continuous monitoring but at any event automatic shut-down of the apparatus in the event of failure of the sensor is already not implemented for double pumps, in relation to closing cylinders which operate at low pressure and in relation to hydraulic storage devices. More specifically, in particular pressure and travel sensors exhibit the problem that their service life is difficult to predict and their operability terminates suddenly. The best procedure also in relation to temperature sensors is to observe a gradual worsening which indicates the need for replacement soon.

In itself the price of sensors is low in comparison with that of the machines. Replacement of the sensors is however a time-consuming operation as in particular travel sensors generally involve difficulties in terms of access and temperature sensors can only be replaced after the machine has cooled down. The attempt has therefore previously been made to make do with the minimum possible number of monitored measurement parameters, with only one sensor being associated with each parameter. The interruption in operation in the event of failure of the sensor has been tolerated.

The basis of the invention is the consideration that the expenditure not only for the provision of but also for the replacement of a relatively large number of sensors is justified if the number of unscheduled interruptions in operation can be reduced.

That object is attained in that at least two sensors are associated with one and the same measurement parameters and the control records the failure of a sensor without causing stoppage of the machine.

One and the same measurement parameter in accordance with the invention occurs when, in a situation involving ideal function, the associated sensors would display the same value. That is to be clearly distinguished from the situation where for example the stretch of each of the four beam members of an injection molding machine is individually measured and the closing pressure is calculated from the certainly different results. Even the fitment of strain gauges at different sides of a beam member in order to be able to detect flexing of the beam member would have nothing to do with the invention as the results supplied by the sensors would basically not be interchangeable.

The main advantage of the invention is that the replacement of failed sensors only has to be effected in the context of regular maintenance. As the sensors measuring identical parameters can be combined together in space, the increase in the number of sensors, in accordance with the invention, does not result in a proportional increase in costs. More specifically, two or more associated sensors can be combined together in a holder, while a housing which encloses the sensors can also contain the evaluation circuit which, besides the measurement value, also transmits the information about the state of the measuring sensing devices.

If the level of redundancy or the system is reduced due to failure of the sensors, that can be displayed to the exterior, which under some circumstances affords the possible option or restoring the normal condition while operation continues. That is the case in particular when it is provided that a shut-off device is provided between at least one sensor for monitoring a fluid pressure and the fluid being monitored.

Further details of the invention will be described hereinafter with reference to the drawings in which.

Figure 1:
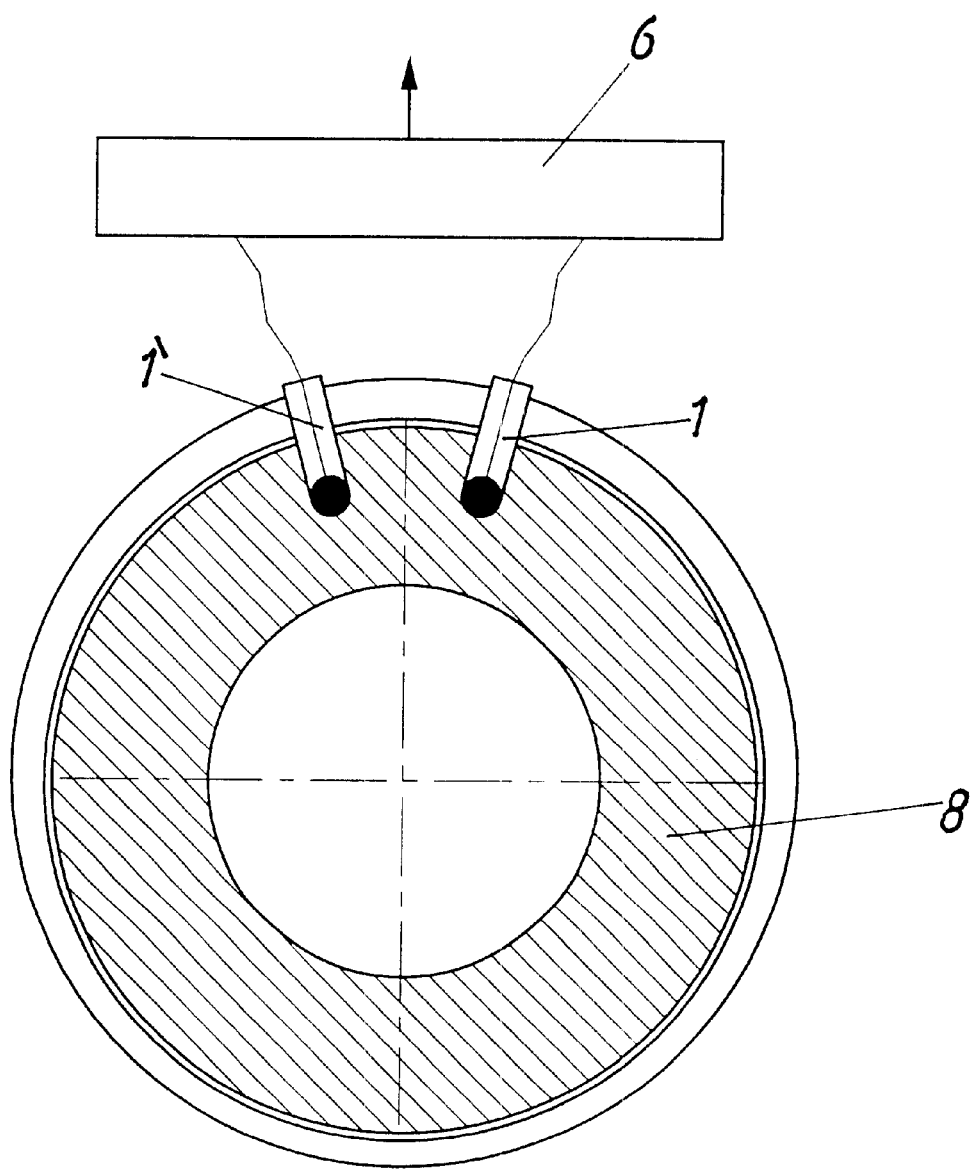
FIG. 1 shows the arrangement according to the invention of heat sensors.

In the embodiment shown in FIG. 1 two sensors 1, 1' which are in the form of temperature sensing devices are arranged in the immediate proximity on the measuring cylinder 8 of an injection molding machine (not shown in other respects) for thermoplastic materials. The measurement signals of the sensors 1, 1' are passed to an evaluation circuit 6 which draws the corresponding conclusions from the difference in the measurement values of the two sensors, that difference vanishing in the ideal situation. In particular, in the event of failure of a sensor, the signal of the other sensor and the piece of information relating to the failure are passed on.

The failure of a sensor does not have to be characterised by the total absence of the measurement value, it can already be assumed to be the case if the measurement values lie outside a reasonable range. In particular it can be provided that more than two sensors are associated with a measurement parameter and the deviation of the value detected by one sensor from the value detected by the other sensors is interpreted as a failure.

Figure 2:
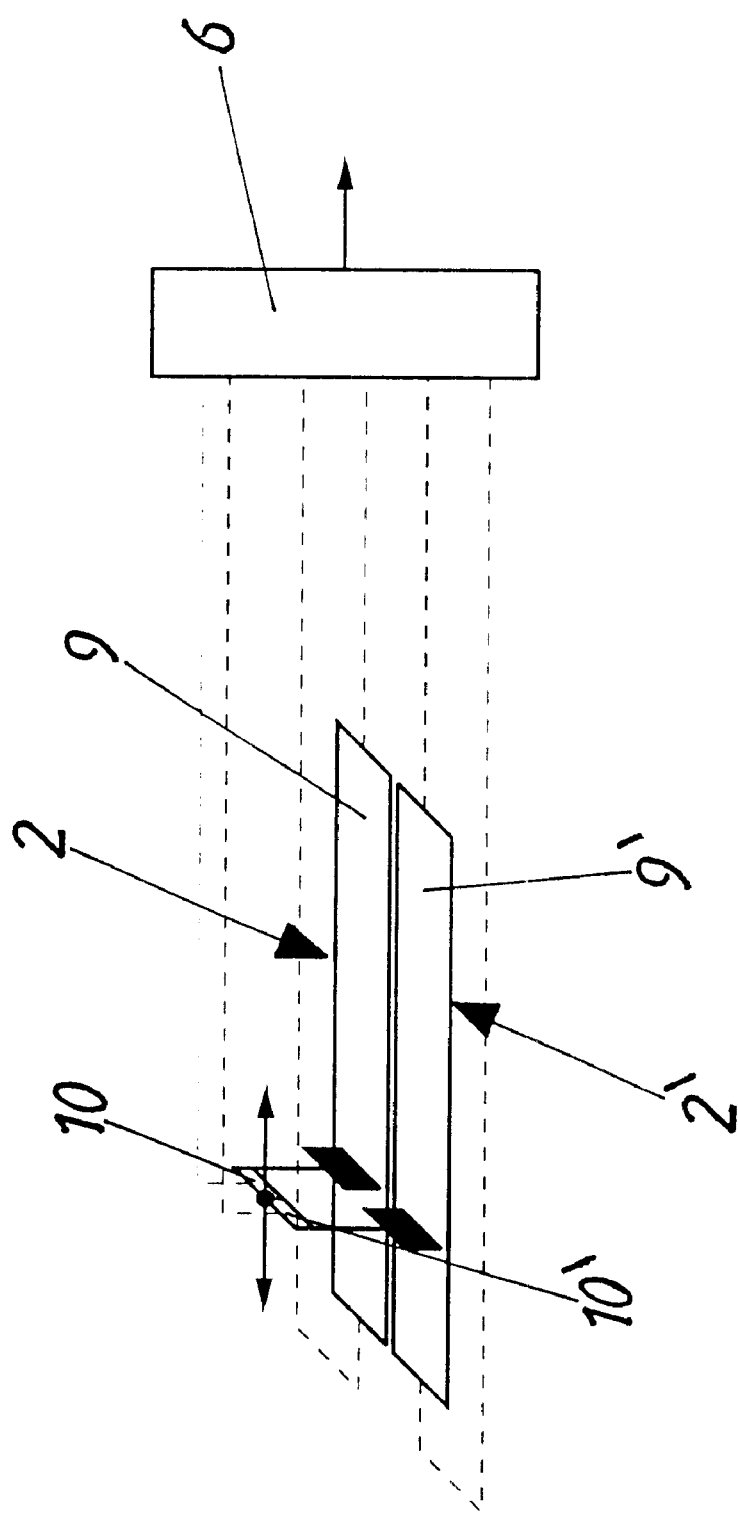
FIG. 2 shows travel measuring devices.

The considerations developed in connection with FIG. 1 apply irrespective of the physical parameter being monitored, for example FIG. 2 showing a travel detecting arrangement in which sensors 2, 2' detect the displacement of contact brushes 10, 10' along the conductor tracks 9, 9'. Once again the failure of a sensor only results in a display about the reduced level of redundancy, but it does not result in the machine being brought to a stop.

Figure 3:
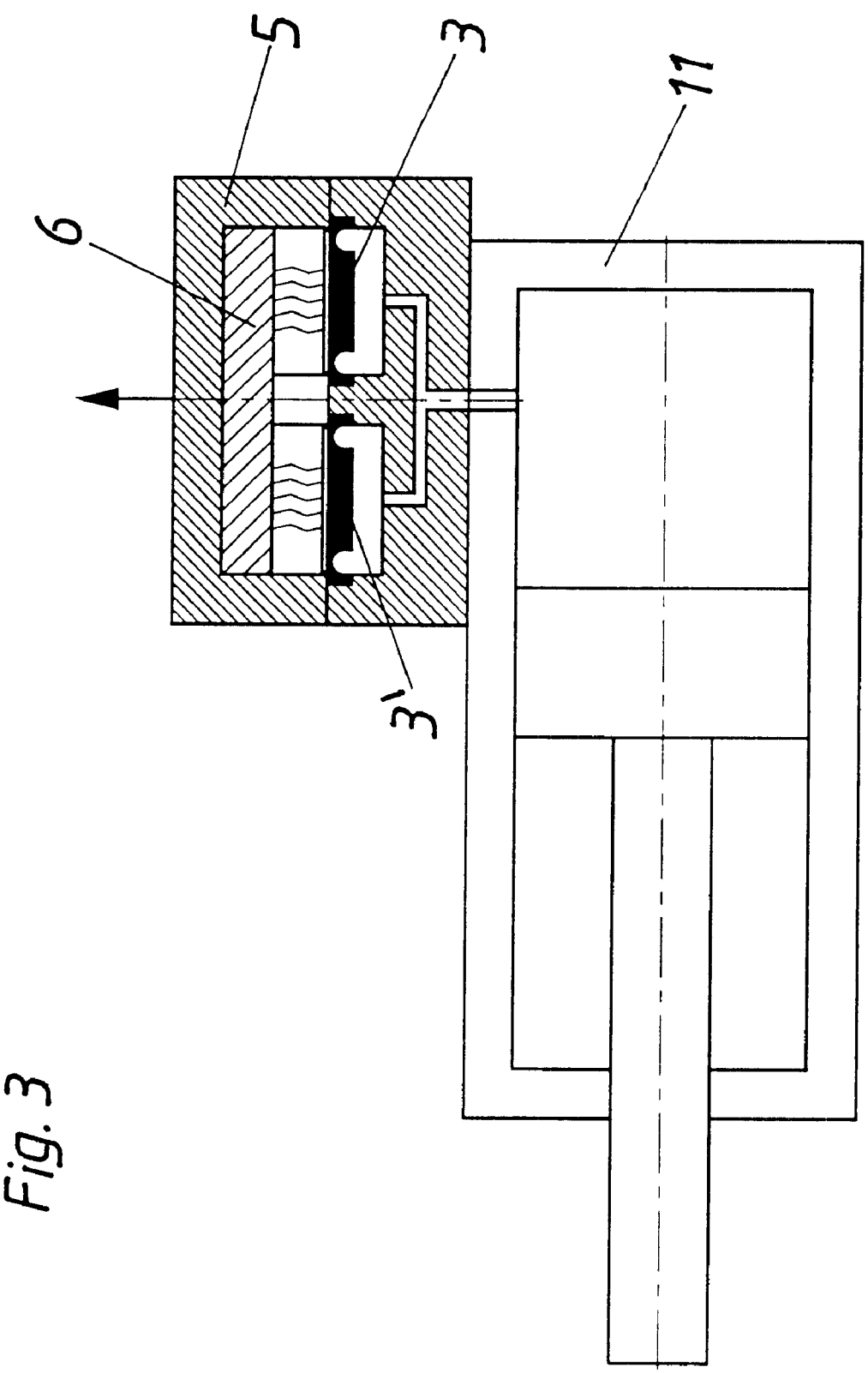
FIGS. 3 and 4 show different embodiments of pressure pick-up devices.
Figure 4:
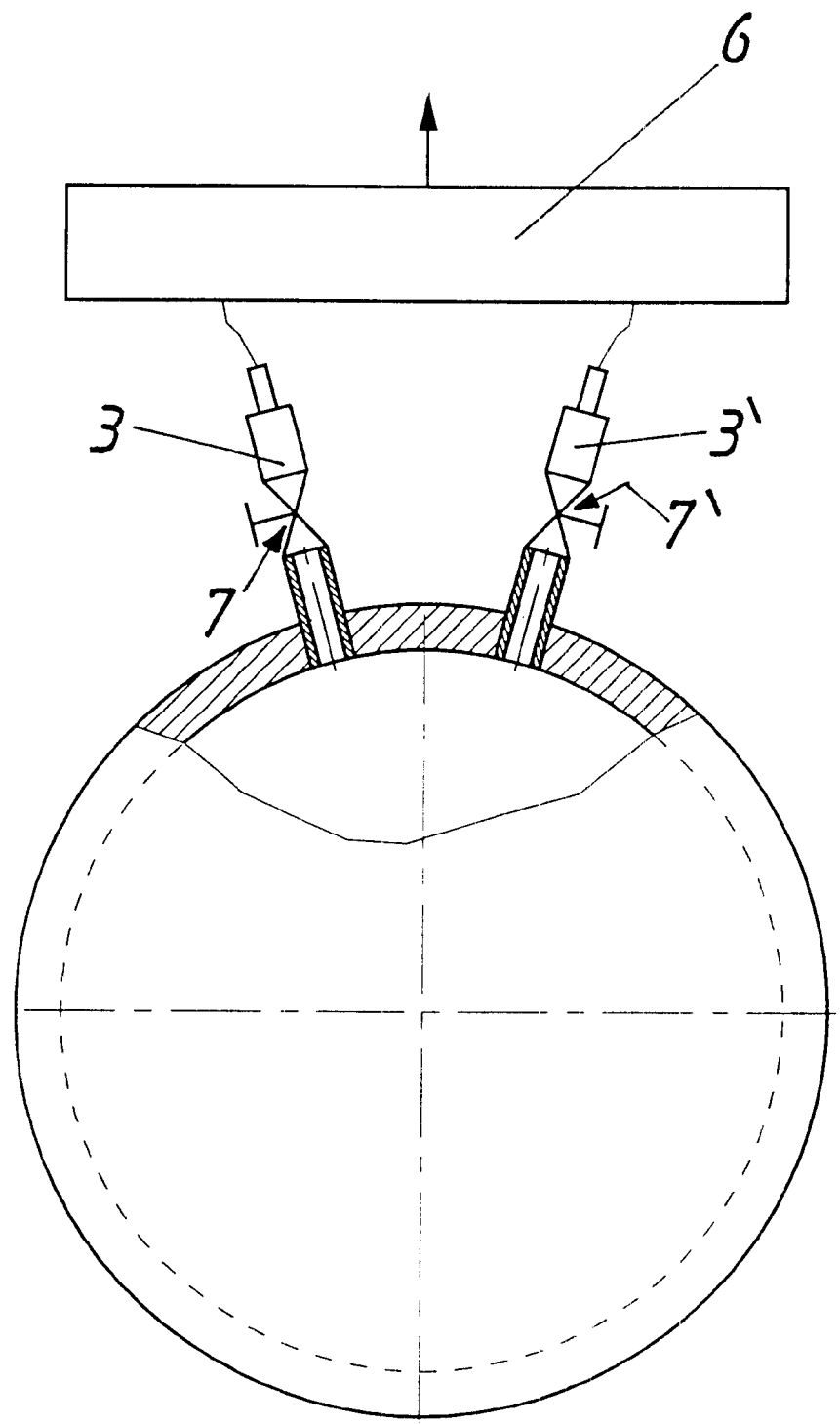

In the embodiment shown in FIG. 3 the pressure of the fluid in the hydraulic cylinder 11 is monitored. It is passed to the separate diaphragms of the sensors 3, 3', the flexing of which causes a measurement signal to go to the evaluation circuit 6. The two sensors 3, 3' are arranged in a common housing, which reduces cost and simplifies assembly. In contrast thereto in the embodiment shown in FIG. 4 the sensors 3, 3' are separate, but shut-off devices 7, 7' make it possible to replace a damaged sensor without interrupting operation of the installation.

The sensor for monitoring the measurement parameter does not have to display a continuous spectrum of values, as in the above-described examples. The invention can also be used in situations in which it is only the attainment or the non-attainment of a given value that is continuously monitored, as is the case for example when using limit switches.

What is claimed is:

1. A method of operating an injection molding machine for plastic materials, the operation of which is interrupted upon failure of the monitoring of at least one measurement parameter, wherein there is provided a control which outputs a signal upon failure of a sensor which detects the measurement parameter, the method comprising:

associating at least two sensors with one and the same measurement parameter and recording failure of one of the sensors using the control without causing stoppage of the machine.

2. A method as set forth in claim 1 wherein more than two sensors are associated with a measurement parameter and a deviation of a value detecting by one sensor from the value detected by the other sensors is interpreted as failure.

3. An injection molding machine for plastic materials, the operation of which is interrupted, upon failure of a monitoring of at least one measurement parameter, comprising:

a control which outputs a signal upon failure of a sensor which detects the measurement parameter;

at least two sensors associated with one and the same measurement parameter;

the control recording the failure of one of the sensors without causing stoppage of the machine; and the at least two sensors being combined together in space and in a holder.

4. An injection molding machine for plastic materials as set forth in claim 3 wherein a housing contains the at least two sensors and an evaluation circuit connected to the sensors.

5. An injection molding machine for plastic materials, the operation of which is interrupted, upon failure of a monitoring of at least one measurement parameter, comprising:

a control which outputs a signal upon failure of a sensor which detects the measurement parameter;

at least two sensors associated with one and the same measurement parameter;

the control recording the failure of one of the sensors without causing stoppage of the machine; and a shut-off device between at least one sensor for monitoring a fluid pressure and a fluid being monitored.

* * * * *